Patented Nov. 6, 1934

1,979,256

UNITED STATES PATENT OFFICE 1,979,256

ELECTRICAL PROTECTIVE SYSTEM

Phillip H. Estes, Rutherford, N. J., assignor to The Western Union Telegraph Company, New York, N. Y., a corporation of New York Application June 1, 1931, Serial No. 541,482

6 Claims. (Cl. 178—69)

My invention relates to electrical protective means and particularly to protective means for systems that are subjected to transient disturbances due to their proximity to electrical power transmission lines.

It is well known to those familiar with the art that when the transmission line conductors of a communication system are parallel to an electric power transmission line, potentials are often induced in the transmission line conductors of the communication system. Such potentials are particularly severe during transient disturbances in the power transmission system, necessitating the installation of protective devices in the communication system to protect its sensitive instruments and translating devices from damage.

One object of my invention is to provide a protective means applicable to a communication system to be protected characterized by the ability of the protective means to ground all the lines of the system upon the occurrence of a transient disturbance on any line of the system.

Another object of my invention is to provide an improved protective means for a communication system, comprising a single relay adapted to ground all of the lines of the communication system upon the occurrence of a transient disturbance on any line of the system.

Another object of my invention is to provide an improved protective means applicable to a communication system to be protected, comprising a plurality of relays so interconnected that operation of any relay in response to a surge on one line of the system will effect operation of all the relays to ground all the lines of the system.

In the following description of the construction and operation of circuits and arrangements disclosing my invention, I shall refer to the accompanying drawings, in which:—

Figures 1, 2:
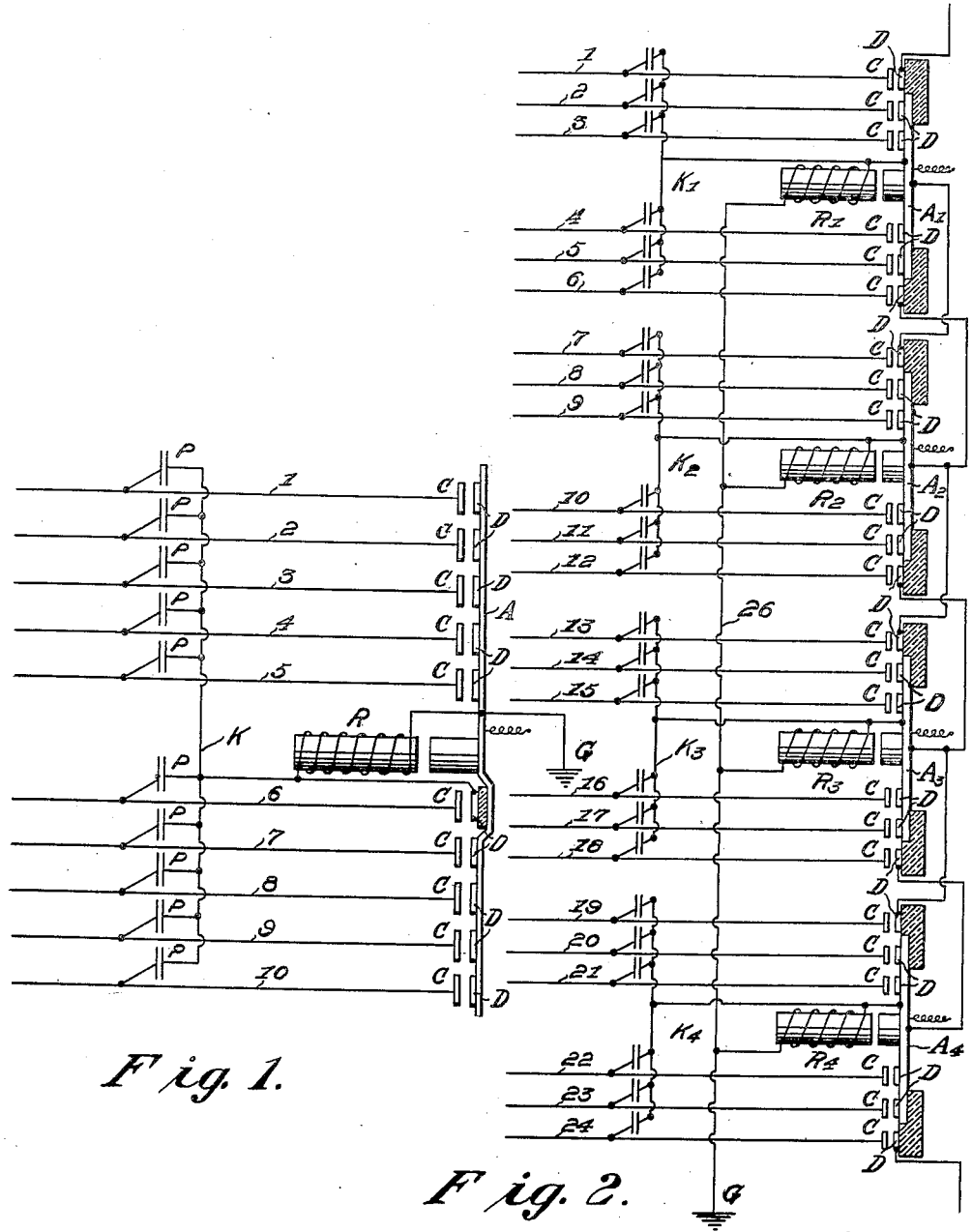
Figure 1 is a diagrammatic view showing one embodiment of my invention applied to a communication system, in which a single relay controls all of the lines of the system.
Figure 2 is a diagrammatic view showing a modified embodiment of my invention applied to a communication system, in which a plurality of electrically interconnected relays are employed.

In Figure 1 the reference numerals 1 to 10 designate lines or conductors of a communication system which is to be protected against abnormal voltages set up therein by an extraneous source such as a power line (not shown). Connected with each line of the communication system is a protective device which may be of any well known type used for the protection of communication circuits. The protective devices P are interconnected by a common conductor K which is connected through the winding of a relay R to the armature A of the relay and to ground at G. Each line of the communication system is connected to one of the contacts C of the relay. The armature A of the relay carries a plurality of contacts D adapted to engage the corresponding contacts C when the relay is energized. One of the contacts D, as shown, is insulated from the armature A and is grounded through the winding of the relay for a purpose which will appear hereinafter.

The manner in which the system operates is as follows: when a transient voltage is set up in the communication system, the breakdown of any one of the protective devices P causes a flow of current over the common conductor K and through the winding of the relay R to ground. This causes the relay to operate, thereby grounding lines 1 to 10 through the contacts and armature of the relay. The grounding of the lines 1 to 10 diverts the flow of current away from the protecting devices P inasmuch as the path of ground through the contacts and armature of the relay is of lower resistance. It will be observed that line 6 is grounded through the insulated contact D and the winding of the relay R, thereby maintaining the relay in its energized condition as long as the abnormal condition continues. The normal current on the lines is not sufficient to operate or hold any of the relays. By reason of this circuit through the winding of the relay, the winding is required to carry only about one-tenth of the total discharge current and consequently it is protected against becoming overloaded.

The modified embodiment of my invention illustrated in Figure 2 is particularly adapted for a communication system comprising a large number of lines. As shown in Figure 2, the lines 1 to 24 are arranged in a plurality of groups, each of which is controlled by a group relay, the latter being designated by the reference characters R1, R2, R3 and R4. In each group the protective devices P are interconnected by a common conductor, the latter being designated by the reference characters K1, K2, K3 and K4. Each of these common conductors is connected to the armature of the respective group relay and also to one terminal of the relay winding. The remaining terminal of each relay winding is grounded. In each group the lines to be protected are connected to the contacts C of the group relay. The armature of each relay carries a plurality of contacts D, two of which are insulated from the armature. On each armature, one of the insulated contacts is connected to an armature of another relay and the other insulated contact is connected to an armature of a third relay. Thus, one insulated contact of armature A2 is connected to the armature A1 of relay R1 and the other insulated contact of armature A2 is connected to the armature A3 of relay R3. Similarly, one insulated contact of armature A3 is connected to the armature A2 of the relay R2 and the other insulated contact of armature A3 is connected to the armature A4 of relay R4. Although I have shown six lines in each group it is to be understood of course that any desired number of lines may be included in a group.

The system illustrated in Figure 2 operates in the following manner: when the protective device on any line breaks down it causes operation of the group relay with which that line is associated and the operated relay grounds all of the lines within the group and at the same time closes circuits for energizing two of the other relays. These in turn ground the lines which they control and close circuits for energizing additional relays. Thus, for example, if the protective device on line 8 should break down, current will flow over the common conductor K2 and through the winding of the relay R2 to ground. Relay R2 will operate, thereby grounding lines 8, 9, 10 and 11 through its own winding, thereby establishing a holding circuit for itself, and at the same time connecting line 7 to ground through the winding of relay R1 and connecting line 12 to ground through the winding of relay R3. Relays R1 and R3 are thus operated. Relay R1 grounds lines 2, 3, 4 and 5 through its own winding, thereby establishing a holding circuit for itself, and at the same time grounds line 6 through the winding of relay R2. Relay R3 grounds lines 14, 15, 16 and 17 through its own winding, thereby establishing a holding circuit for itself, and at the same time grounds line 13 through the winding of relay R2. Relay R3 also grounds line 18 through the winding of relay R4 causing the operation of relay R4. This relay grounds lines 20, 21, 22 and 23 through its own winding, thereby establishing a holding circuit for itself and at the same time grounds line 19 through the winding of relay R3.

Figures 3, 4:
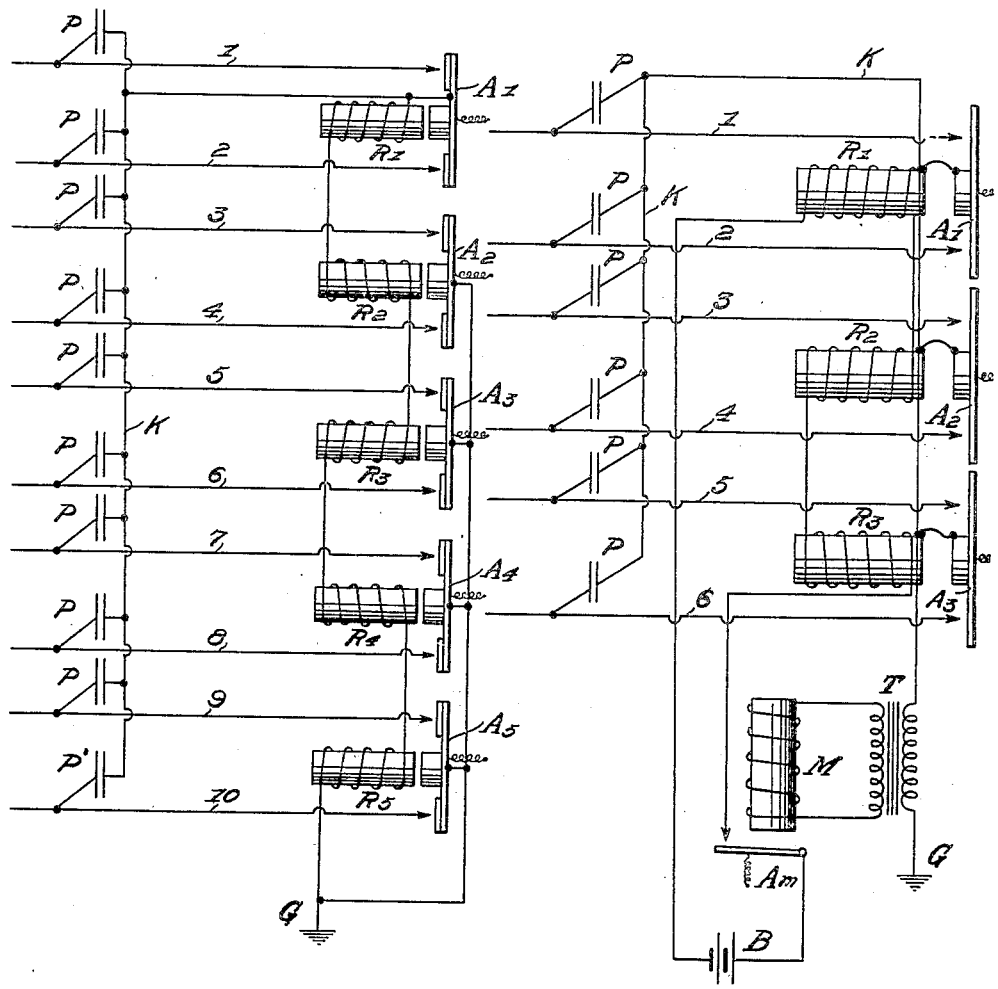
Figure 3 is a diagrammatic view showing a further modified embodiment of my invention employing a different form of electrical interlocking connection.
Figure 4 is a diagrammatic view showing a further modified embodiment of my invention employing a still different form of interlocking connection.

In the embodiment of my invention illustrated in Figure 3, the group relays R1, R2, R3, R4 and R5 are connected in series, one terminal of this series circuit being connected to the common conductor K and the other terminal to ground. The armature of relay R1 is connected to the common conductor K whereas the armatures of the relays R2, R3 and R4 and R5 are connected to ground. In operation, the breakdown of any one of the protective devices P causes a flow of current over the common conductor K and through the windings of relays R1, R2, R3, R4 and R5 in series, to ground. This will cause all of the relays to operate, thereby grounding lines 3, 4, 5, 6, 7, 8, 9 and 10 through the contacts and armatures of relays R2, R3, R4 and R5. Lines 1 and 2 are also grounded, but through the windings of all of the relays in series. Accordingly, all of the relays remain energized by the discharge from the lines 1 and 2. Although as shown in Figure 3, each relay is associated with two lines, it will be understood that each relay may be provided with additional contacts so as to control more than two lines.

In the embodiment of my invention illustrated in Figure 4, the common conductor K, which interconnects the protective devices P, is connected to one terminal of the primary winding of a transformer T, the other terminal of the primary winding being connected to ground. Connected across the secondary winding of the transformer T is the winding of a master relay M which, at its armature Am, controls a circuit which includes a battery B and the windings of the relays R1, R2 and R3 in series. The armatures A1, A2 and A3 of these relays are connected to the common conductor K. In operation, the break down of any protective device P causes a flow of current over common conductor K and through the primary winding of the transformer T to ground. The voltage induced in the secondary winding of the transformer causes a flow of current through the winding of the master relay M. Operation of master relay M establishes a circuit from battery B through the windings of relays R1, R2 and R3 in series and over the front contact and armature Am of master relay M back to battery. Relays R1, R2 and R3 become energized and connect all of the lines to ground through the primary winding of the transformer. When the abnormal condition in the system has been discharged the relays will become deenergized and the system will be automatically returned to normal condition in readiness to operate again in the same manner upon the occurrence of another abnormal disturbance on any of the lines of the system. To prevent overloading of the master relay M the transformer T is so designed that it has a one-to-one ratio of current at low value of current but a lower ratio at high value of current. This may be accomplished by designing the magnetic core of the transformer so that it becomes saturated upon the flow of a predetermined current through its primary coil. While I prefer to interpose a transformer between the grounded line and the master relay for the reason stated, yet it may be possible to so design the master relay that it can carry the maximum current to which the grounded line may be subjected without injury and hence may be placed directly in the grounded line.

While I have illustrated the relays in Figs. 3 and 4 as being series, it is evident that they may be connected in parallel.

I have shown several different arrangements which embody the self-restoring feature of my invention but it will be evident to engineers that other arrangements and various changes may be made within the scope of my claims.

While this invention has been disclosed as embodied in particular forms, it is to be understood that it is capable of embodiment in other forms without departing from the spirit and the scope of the appended claims.

I claim:

1. In an electrical protective system, the combination with a plurality of lines to be protected from voltages set up by an extraneous source, of a protective device individual to each line, a plurality of relays each arranged to ground a different plural group of said lines, and interconnections whereby all of said relays respond simultaneously to the operation of any one of said protective devices.

2. In an electrical protective system the combination with a plurality of lines to be protected from voltages set up by an extraneous source, of a protective device connected with each line and means responsive to operation of any one of said protective devices for connecting all of said lines to ground through paths in parallel with said protective devices, said means comprising a plurality of relays each of which controls a group of said lines, one of said paths including the windings of all of said relays whereby a holding circuit is established for said relays when they are operated.

3. In an electrical protective system the combination with a plurality of lines to be protected from voltages set up by an extraneous source, of a protective device connected with each line and means responsive to operation of any one of said protective devices for connecting all of said lines to ground, said means comprising a plurality of relays each of which controls a group of said lines and a master relay for controlling said first mentioned relays, said relays being adapted to return to normal condition upon the cessation of the abnormal voltage.

4. In an electrical protective system the combination with a plurality of lines to be protected from voltages set up by an extraneous source, of a protective device connected with each line and means responsive to operation of any one of said protective devices for connecting all of said lines to ground, said means comprising a plurality of relays each of which controls a group of said lines and a master relay for controlling said first mentioned relays.

5. In an electrical protective system the combination with a plurality of lines to be protected from voltages set up by an extraneous source, of a protective device connected with each line, a common conductor interconnecting said devices, a master relay responsive to a voltage discharge over said common conductor and a plurality of relays responsive to operation of said master relay for connecting all of said lines to ground through paths including said common conductor.

6. In an electrical protective system the combination with a plurality of lines to be protected from voltages set up by an extraneous source, of a protective device connected with each line, a common conductor interconnecting said devices and including a transformer, a master relay connected in the secondary circuit of said transformer and responsive to a voltage discharge over said common conductor and a plurality of relays responsive to operation of said master relay for connecting all of said lines to ground, said master relay and the relays controlled thereby returning automatically to normal condition upon the cessation of the abnormal voltages.

PHILLIP H. ESTES.